INVENTORS
TOKUZI USHIKUBO
IWAO KIKUCHI

BY Paul M. Craig, Jr.
ATTORNEY

INVENTORS
TOKUZI USHIKUBO
IWAO KIKUCHI

BY Paul M. Craig, Jr.
ATTORNEY 3,444,424
HORIZONTAL DEFLECTION CIRCUIT WITH PROTECTIVE DIODE Tokuzi Ushikubo, Sayama-shi, and Iwao Kikuchi, Kodaira-shi, Japan, assignors to Hitachi, Ltd., Tokyo, Japan, a corporation of Japan Filed Oct. 12, 1965, Ser. No. 495,230
Claims priority, application Japan, Oct. 21, 1964, 39/59,844
Int. Cl. H01j 29/76
U.S. Cl. 315—27 17 Claims

ABSTRACT OF THE DISCLOSURE

A transistorized horizontal deflection circuit for television receivers wherein damage to the horizontal deflection power transistor due to abnormal currents developed in the high voltage circuit supplying high voltage to the cathode-ray tube is prevented through provision of a protective diode in a closed circuit including the transistor and a coil of the flyback transformer, the diode having a polarity opposite to the polarity of the emitter junction of the transmitter.

Figure 1:
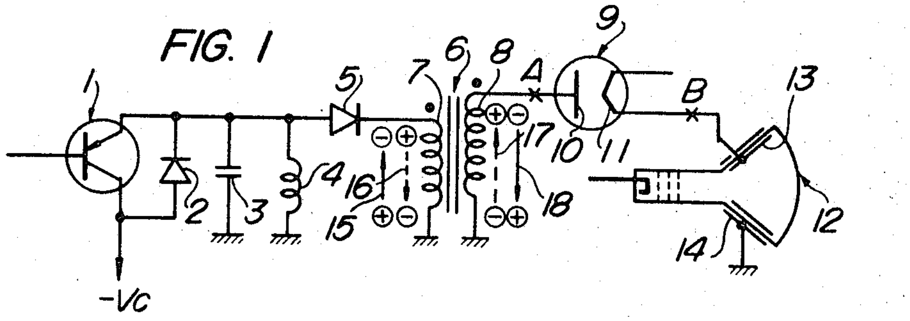

This invention relates to a transistorized horizontal deflection circuit for television receivers, and more particularly to circuit means for incorporation in such horizontal deflection circuit so as to prevent breakdown of a horizontal deflection power transistor in the horizontal deflection circuit due to an abnormal overcurrent developed in the high-voltage circuit supplying high voltage to the cathode ray tube in a television receiver.

In a horizontal deflection circuit of a television receiver, its horizontal power circuit generally generates a saw tooth waveform in order to cause the electromagnetic deflection of electron beams in the cathode ray tube. This circuit also supplies anode voltage for the acceleration of the electron beams in the cathode ray tube. Commonly a high-voltage circuit for supplying a high voltage to the anode of the cathode ray tube is electromagnetically coupled to the horizontal deflection circuit by means of a flyback transformer. In order to obtain the anode voltage for the cathode ray tube, a pulse voltage regularly generated across a horizontal deflecting coil connected to the primary coil of the flyback transformer is boosted by the secondary coil of the flyback transformer and this voltage is rectified by a high-voltage rectifier tube. This anode voltage is required to have a value of at least 6 to 10 kilovolts even, for example, in a relatively small-sized cathode ray tube used with a transistorized television receiver.

In a transistor circuit for driving an inductive load such as a deflecting coil, high voltage is generated in response to variation of current flowing across the inductive load. While it is possible to obtain a transistor which can withstand a high voltage and a high current pulse regularly generated under a steady state, an unexpected transient state of even a short period may become a cause of supplying a voltage or current which is sufficient to cause breakdown of the transistor.

In a transistorized horizontal deflection circuit, a pulse voltage generated across an inductive load of a deflecting coil is generally set at a value lower than the maximum permissible collector voltage of the transistor which drives the inductive load of the deflecting coil. For example, this pulse voltage is of the order of 100 volts when a power supply to the horizontal deflection power transistor is 12 volts and the fiback time is 18% of a horizontal scanning period (63.5 $\mu$s.). Accordingly, the maximum permissible collector voltage possible for this transistor is more than 100 volts.

On the other hand, current flowing into the deflection power transistor at a steady state is determined by current of saw tooth waveform flowing across the deflecting coil. Therefore, the allowable current and allowable voltage required for the horizontal deflection power transistor are determined by the pulse voltage generated across the deflecting coil and the saw tooth current flowing across the deflecting coil.

It is easy to obtain a transistor which can withstand a high tension voltage or a high current pulse developed across the deflecting coil under the steady state, but it is a matter of considerable difficulty to obtain a transistor which can withstand an unexpected transient state. Such an unexpected transient state occurs, for example, when an overcurrent is caused to flow through the high-voltage circuit as a result of haphazard discharge between the anode and cathode of a high-tension rectifier tube for a reason such as mechanical vibration, and this overcurrent induces an overcurrent in the horizontal deflection circuit, or when a shorting trouble occurs in the high-tension circuit.

Thus if such abnormal overcurrent conducts through the high-voltage circuit, this abnormal overcurrent induces an overcurrent in the horizontal deflection circuit. This overcurrent in the horizontal deflection circuit flows into the horizontal deflection power transistor if this transistor is on at this moment. The phenomenon that this overcurrent flows into the transistor may also be considered in the following way. That is, it may be considered that an equivalent inductance of the inductive load connected to the horizontal deflection power transistor is reduced by the shorting trouble in the high-voltage circuit, and as a result thereof, an excessive increase takes place in the load current flowing across this transistor during its on period. Further, as the result of conduction of this overcurrent, an excessively high pulse voltage is induced in the inductive load. This overcurrent, although its duration is quite limited, flows in accelerated relation into the transistor and causes breakdown of the transistor. This kind of transistor breakdown is considered as a phenomenon of secondary breakdown caused by the accelerated consumption of energy during an extremely short period.

It is the primary object of the present invention to provide an improved horizontal deflection circuit equipped with means for providing protection against breakdown of a power transistor due to a transient state of the horizontal deflection circuit resulting from a shorting trouble in a high-voltage circuit.

An important feature of the present invention is that a diode is disposed in series with the primary coil of a flyback transformer so that an overcurrent induced in the primary coil with relation to an abnormal current in the high-tension circuit during the on-state of a horizontal deflection power transistor may not flow into the horizontal deflection power transistor, and said diode is connected in series with the primary coil in a manner that it does not obstruct the supply of saw tooth current to a deflecting coil from the horizontal deflection power transistor.

Figure 3:
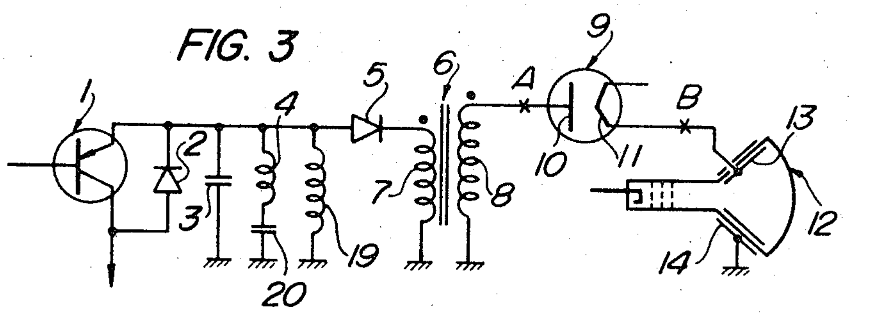
Figure 4:
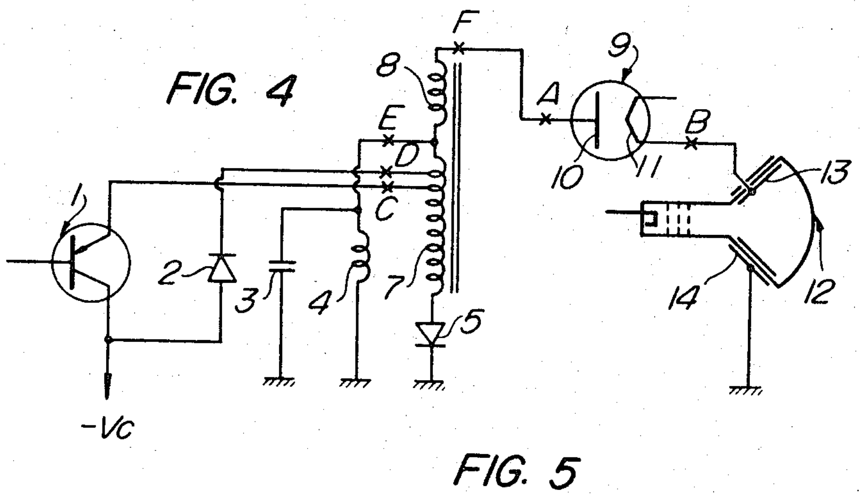
Figure 5:
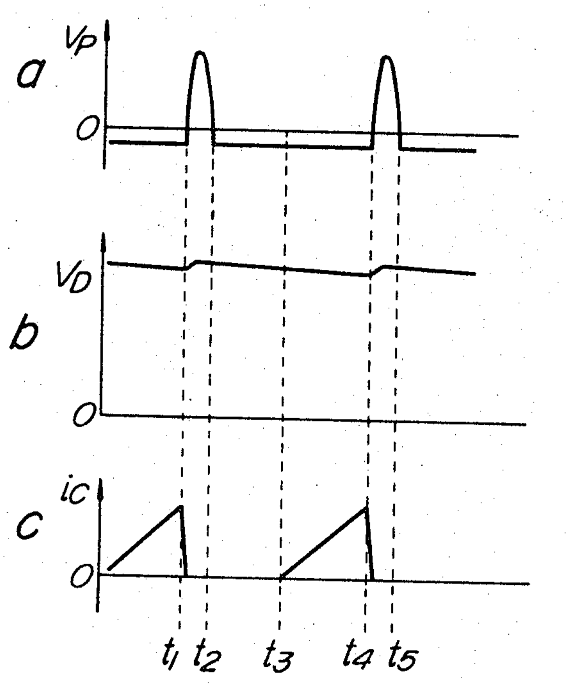

The above and other objects, advantages and features of the present invention will become more apparent from the following description with reference to the accompanying drawings, in which:

FIGS. 1 to 4 are schematic circuit diagrams illustrating various embodiments according to the present invention; and FIG. 5 is a graphic representation of current and voltage waveforms at various parts of the circuit of the invention, wherein *a*, *b* and *c* show a pulse voltage waveform generated across a deflecting coil, a voltage waveform applied to the anode of a cathode ray tube and a collector current waveform flowing across a horizontal deflection power transistor, respectively.

A PNP type transistor is shown in each of FIGS. 1 to 4, but this is by way of example only and the invention is also applicable to a circuit including an NPN type transistor.

The circuit arrangement shown in FIG. 1 includes a horizontal deflection power transistor 1, a damper diode 2 connected in parallel with the transistor 1, a resonance capacitance 3, a deflecting coil 4 for electromagnetically deflecting the electron beam in a cathode ray tube 12, a diode 5, a flyback transformer 6 having a primary coil 7 and a secondary coil 8, and a high-voltage rectifier tube 9 having its anode 10 connected to the secondary coil 8 of the flyback transformer 6 and its cathode 11 connected to the anode 13 of the cathode ray tube 12. An electrode 14 coated on the outer surface of the cathode ray tube 12 at a position opposite the anode 13 forms a condenser in cooperation with the anode electrode 13, and this coated outer electrode 14 is grounded.

In this circuit arrangement, the horizontal deflection power transistor 1, the damper diode 2, the resonance capacitance 3 and the deflecting coil 4 constitute a horizontal deflection circuit, and the secondary coil 8 electromagnetically coupled to the primary coil 7 connected in parallel with the deflecting coil 4, the high-voltage rectifier tube 9 and the cathode ray tube 12 constitute a high-voltage circuit.

The interposition of the diode 5 which is characteristic of the present invention should be done in such a way that it is disposed in series with the primary coil 7 of the flyback transformer 6 and in a polarity in which overcurrent does not flow into the horizontal deflection power transistor 1. Further, the diode 5 must be positioned at that portion of the lines in a closed circuit formed by the horizontal deflection power transistor 1 and the primary coil 7 which is not common to the lines in a closed circuit formed by the horizontal deflection power transistor 1 and the deflecting coil 4.

The circuit according to the present invention operates in the following manner. During an off-period of the horizontal deflection power transistor 1 corresponding to a time interval between $t_1$ and $t_2$ in FIG. 5, pulse voltage of a waveform as shown in FIG. 5*a* is generated across the primary coil 7 of flyback transformer 6 and its polarity is positive with respect to earth potential. This pulse voltage is boosted and appears across the secondary coil 8. The pulse voltage induced in the secondary coil 8 is positive with respect to the earth potential as in the case of the primary coil 7. In other words, potential at point A is positive with respect to the earth potential. As a result, potential of the plate 10 of high-voltage rectifier tube 9 becomes positive with respect to its cathode 11. This voltage is rectified by the rectifier tube 9 to charge the condenser formed by the electrodes 13 and 14. Thus anode voltage of the cathode ray tube 12, that is, voltage between point B and earth becomes substantially constant relative to time as shown in FIG. 5*b*.

Suppose, during such operation, abnormal current is conducted through the high-voltage circuit in a direction as shown by broken line 17 in FIG. 1 for any reason as when discharge takes place between the anode 10 and the cathode 11 of high-voltage rectifier tube 9. In this case, overcurrent is induced in the primary coil 7 in a direction as shown by broken line 16, but this overcurrent can not flow into the horizontal deflection power transistor 1 because the transistor 1 is in its off state. However, in case abnormal current is conducted through the high-voltage circuit in a direction as shown by solid line 18 as for the reason as described above during the on-period of the horizontal deflection power transistor 1 corresponding to a time interval between $t_3$ and $t_4$ in FIG. 5, overcurrent is induced in the primary coil 7 in a direction as shown by solid line 15. If the diode 5 is not interposed as in the prior circuit, the overcurrent thus developed would flow into the transistor 1 to thereby cause breakdown of the same. However, by virtue of interposition of the diode 5 in accordance with the present invention, the diode 5 blocks this overcurrent and can thus protect the horizontal deflection power transistor 1 against unexpected breakdown.

The protective diode 5 may for example be a Si diffusion type diode. As far as our experiment is concerned, this diode permits a maximum voltage value of at least 200 volts. The voltage limit for the diode is determined by the magnitude of the excessively high pulse voltage generated across the primary coil 7 consequent upon conduction of an overcurrent therethrough. It will be understood that, by thus interposing the protective diode 5, it is possible to protect the transistor 1 from possible breakdown due to transient circuit conditions associated with the high-voltage circuit. No obstruction whatsoever is imparted by the protective diode 5 to the supply of anode voltage for the cathode ray tube 12 since the diode 5 remains in its conducting state for the pulse voltage regularly occurring in the steady state.

Figure 2:
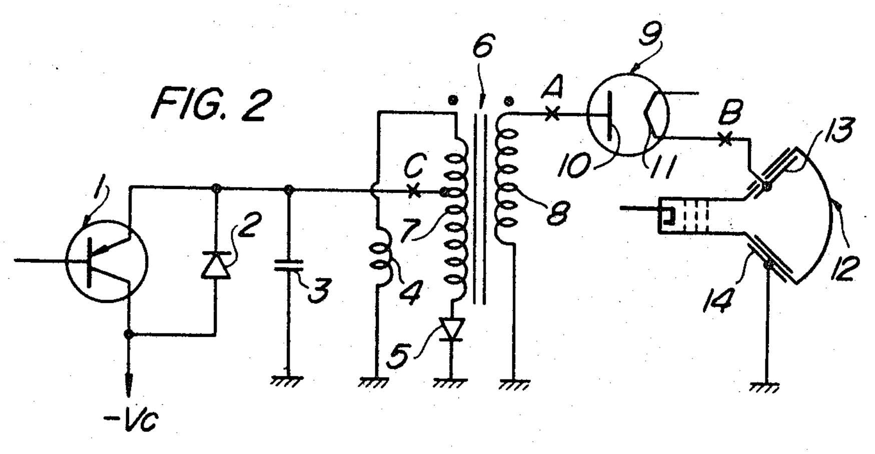

FIGS. 2, 3 and 4 show other embodiments of the present invention and like reference numerals are used therein to denote like parts appearing in FIG. 1.

In the embodiment of FIG. 2, a deflecting coil 4 is connected with a horizontal deflection power transistor 1 through the primary coil 7 of a flyback transformer 6. In some cases, it may be difficult to obtain a deflecting coil having a required inductance value since the inductance of a deflecting coil is predetermined at a certain definite value such as 100 μh. from a manufacturing point of view. Accordingly, there may be a case in which provision of a transformer is necessary to connect a deflecting coil as a most suitable load for a particular horizontal deflection power transistor used therewith. In FIG. 2, a tap C is provided on the primary coil 7 of flyback transformer 6 and the collector of transistor 1 is connected to this tap C. In this manner, the inductance of the deflecting coil 4 is converted by an auto transformer constituted by the primary coil 7 into an optimum inductance for the transistor 1.

In the embodiment shown in FIG. 3, DC bias for a transistor 1 is supplied through an inductance 19 so that biasing direct current for the transistor 1 may not flow into a deflecting coil 4. Depending on the kind of deflecting coil, conduction of direct current therethrough may cause magnetic saturation due to DC excitation to thereby distort the picture on the cathode ray tube. In order to prevent direct current from flowing through the deflecting coil 4, a condenser 20 is connected in series with the deflecting coil 4 in the embodiment of FIG. 3 so that the transistor 1 can be biased through the inductance 19. The value of the inductance 19 is made sufficiently high compared with the inductance value of the deflecting coil 4. For example, the value of the inductance 19 is set at more than ten times the inductance value of the deflecting coil 4.

The embodiment shown in FIG. 4 refers to a case in which the secondary coil 8 and the primary coil 7 of a flyback transformer are connected in series with each other to form the so-called autotransformer. A plurality of taps C, D and E are provided on the continuously wound coils 7 and 8 of the flyback transformer. A horizontal deflection power transistor 1, a damper diode 2 and a deflecting coil 4 are connected to those taps in such a way that the damper diode 2 is connected to the tap D which is at a higher potential than the tap C connected to the transistor 1, while a high-voltage rectifier tube 9 is connected to a terminal F which is at a much higher potential than the tap E to which the deflecting coil 4 is connected.

In order to assure the prominent effect of the present invention, the inventors made experiments on a transistorized television receiver designed to operate with a source voltage of 12 volts. In the experiments, discharge was artificially caused in its high-voltage circuit to observe variation of collector current flowing through the horizontal deflection power transistor and variation of pulse voltage generated across the primary coil of flyback transformer. The results are as shown in the following table.

| Experiment No. | Condition | Collector current (peak value) of deflection power transistor (amp) | Flyback pulse voltage (peak value) |
|---|---|---|---|
| 1 | Without protective diode | 16.5 | 180 |
| 2 | With protective diode | 8.0 | 120 |

The cathode ray tube of the television receiver used in the experiments has a diameter of 6 inches. Under the normal operative state of the receiver, anode voltage at the cathode ray tube, saw tooth current supplied to the deflecting coil, collector current of the horizontal deflection power transistor, and pulse voltage generating across the primary coil of the flyback transformer are 8 kilovolts, 6 amperes (peak to peak), 3.6 amperes (peak value) and 84 volts (peak value), respectively. Experiment No. 1 in the table represents a case with the prior circuit in which the protective diode 5 is not included, while Experiment No. 2 represents a case with the circuit according to the present invention. As will readily be apparent from the results, overcurrent that flows through the deflection power transistor can be suppressed by the interposition of the protective diode.

It will be appreciated that positive protection against possible breakdown of a horizontal deflection power transistor due to a transient state associated with a high-voltage circuit can be provided by the present invention. In addition, the present invention is advantageous in that it can easily be put into practice.

What is claimed is:

1. In ahorizontal deflection circuit including in circuit a horizontal deflection power transistor, a damper diode, a resonance capacitance, a deflecting coil and a flyback transformer having at least one coil, the improvement essentially comprising a protective diode connected in series circuit with said horizontal deflection power transistor only through the coil of said flyback transformer, said protective diode having a polarity opposite to the polarity of the emitter junction of said horizontal deflection power transistor whereby an overcurrent flowing through the coil of said flyback transformer cannot flow into said horizontal deflection power transistor.

2. A horizontal deflection circuit according to claim 1, wherein said deflecting coil is connetced in parallel with said horizontal deflection power transistor, said flyback transformer is provided with a primary and a secondary coil, said primary coil forming a series cricuit with said protective diode, said series circuit being connected in parallel with said deflecting coil, and further including a high voltage rectifier connected to a cathode-ray tube, said secondary coil of said flyback transformer being connected with said high voltage rectifier connected to said cathode-ray tube.

3. A horizontal deflection circuit according to claim 1, wherein said flyback transformer is provided with a primary coil having at least one tap and a secondary coil, said protective diode having one terminal connected in series with one end of said primary coil, said horizontal deflection power transistor being connected between said one tap on said primary coil and the other terminal of said protective diodes, said deflecting coil being connected between the other end of said primary coil and said other terminal of said protective diode to which said horizontal deflection power transistor is connected, and further including a high voltage rectifier connected to a cathode-ray tube, said secondary coil of said flyback transformer being connected with said high voltage rectifier connected to said cathode-ray tube.

4. A horizontal deflection circuit according to claim 1, wherein said flyback transformer is provided with a primary coil and a secondary coil connected in series with said primary coil, said primary coil including first and second ends with at least one tap therebetween, said secondary coil having one end and a second end connected to the second end of said primary coil, said protective diode being connected in series with said primary coil, said horizontal deflection power transistor being connected between said tap on said primary coil and one terminal of said protective diode, the other terminal of which is connected with the first end of said primary coil, said deflecting coil being connected between the second end on said primary coil and said one terminal of said protective diode, and further including a high voltage rectifier connected to a cathode-ray tube, the one end of said secondary coil being connected with said high-voltage rectifier connected to said cathode-ray tube.

5. A horizontal deflection circuit according to claim 1, in which bias means for providing a DC bias for said horizontal deflection power transistor is applied to said transistor through a bias inductance connected thereto.

6. A horizontal deflection circuit according to claim 2 wherein the circuit arrangement is such that said horizontal deflection power transistor is of PNP type, said horizontal deflection power transistor having its emitter connected to the anode of said protective diode.

7. A horizontal deflection circuit according to claim 2 wherein the circuit arrangement is such that said horizontal deflection power transistor is of NPN type, said horizontal deflection power transistor having its emitter connected to the cathode of said protective diode.

8. A horizontal deflection circuit according to claim 3 wherein the circuit arrangement is such that said horizontal deflection power transistor is of PNP type, said horizontal deflection power transistor having its emitter connected through said primary coil to the anode of said protective diode.

9. A horizontal deflection circiut according to claim 3 wherein the circuit arrangement is such that said horizontal deflection power transistor is of NPN type, said horizontal deflection power transistor having its emitter connected through said primary coil to the cathode of said protective diode.

10. A horizontal deflection circuit according to claim 4 wherein the circuit arrangement is such that said horizontal deflection power transistor is of PNP type, said horizontal deflection power transistor having its emitter connected through said primary coil to the anode of said protective diode.

11. A horizontal deflection circuit according to claim 4 wherein the circuit arrangement is such that said horizontal deflection power transistor is of NPN type, said horizontal deflection power transistor having its emitter connected through said primary coil to the cathode of said protective diode.

12. A horizontal deflection device comprising:

a transistor the output of which is constituted by the emitter and collector electrodes; a damper diode connected in parallel with the output of said transistor; a resonance circuit connected in parallel with the output of said transistor and including a resonance capacitance and a deflecting coil; a flyback transformer having a primary winding and a secondary winding; a high-tension rectifier the anode of which is connected to one terminal of said secondary winding; a cathode-ray tube the anode of which is connected to the cathode of said high-tension rectifier; and a protective diode connected so as to have a polarity opposite to the polarity of the emitter junction of said transistor, said diode being connected in series with said primary winding of said flyback transformer and the combination of said protective diode and said primary winding of said flyback transformer being connected in parallel with said output of said transistor and said resonance circuit.

13. A horizontal deflection device comprising: a transistor; means for supplying a D.C. bias to the collector electrode of said transistor; a damper diode connected between the collector and emitter electrodes at said transistor; a resonance circuit connected between the emitter electrode of said transistor and the common reference potential and including a resonance capacitor and a deflecting coil; a flyback transformer having primary and secondary windings; a protective diode connected in series with the primary winding of said transformer; a high-tension rectifier the anode of which is connected to the one terminal of said secondary winding; and a cathode-ray tube the anode of which is connected to the cathode of said high-tension rectifier; the series combination of said protective diode and said primary winding of said transformer being connected between the emitter electrode of said transistor and the common reference potential, said protective diode being connected so as to have a polarity opposite to the polarity of the emitter junction of said transistor.

14. A device according to claim 13, further including a third coil connected between the emitter electrode of said transistor and the common potential and a second capacitor connected in series with said deflecting coil.

15. A device according to claim 13, in which said primary winding has at least one tap, the emitter electrode of said transistor is connected to said tap, said protective diode is connected between one terminal of said primary winding and the common reference potential, said deflection coil is connected between the other terminal of said primary winding and the common reference potential, said deflection coil is connected between the other terminal of said primary winding and the common reference potential.

16. A device according to claim 15, in which the other terminal of said secondary winding is connected to the other terminal of said primary winding.

17. A device according to claim 13, in which said protective diode is connected between the emitter electrode of said transistor and one terminal of said transformer, and the other terminal of said transformer is connected to the common reference potential.

References Cited

UNITED STATES PATENTS

| | | | |
|---|---|---|---|
| 3,287,594 | 11/1966 | Wada | 315—27 |
| 3,302,056 | 1/1967 | Preisig | 315—27 |
| 2,896,114 | 7/1959 | Maloff | 315—27 |

RODNEY D. BENNETT, Jr., *Primary Examiner.*

J. G. BAXTER, *Assistant Examiner.*